United States Patent
Kimbell et al.

(10) Patent No.: US 7,426,314 B2
(45) Date of Patent: Sep. 16, 2008

(54) ADJUSTING PIXELS BY DESIRED GAINS AND FACTORS

(75) Inventors: Benjamin D. Kimbell, Fort Collins, CO (US); Casey L. Miller, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 770 days.

(21) Appl. No.: 10/909,214

(22) Filed: Jul. 30, 2004

(65) Prior Publication Data

US 2006/0023965 A1    Feb. 2, 2006

(51) Int. Cl.
*G06K 9/40*    (2006.01)

(52) U.S. Cl. .................. 382/260; 382/260
(58) Field of Classification Search .......... 382/54, 382/263, 294, 254; 358/284
See application file for complete search history.

(56) References Cited

U.S. PATENT DOCUMENTS

| | | | | |
|---|---|---|---|---|
| 4,825,297 A * | 4/1989 | Fuchsberger et al. | ........ | 358/447 |
| 5,038,388 A * | 8/1991 | Song | .......... | 382/266 |
| 5,060,056 A | 10/1991 | Miki et al. | .......... | 348/617 |
| 5,333,054 A | 7/1994 | Tanaka et al. | .......... | 348/666 |
| 5,563,963 A | 10/1996 | Kaplan et al. | .......... | 382/266 |
| 5,671,013 A | 9/1997 | Nakao | .......... | 348/234 |
| 5,732,159 A | 3/1998 | Jung | | |
| 5,774,599 A * | 6/1998 | Muka et al. | .......... | 382/254 |
| 5,969,829 A | 10/1999 | Matsuda et al. | .......... | 358/475 |
| 6,058,220 A | 5/2000 | Hillen et al. | | |
| 6,111,980 A | 8/2000 | Sano et al. | .......... | 382/167 |
| 6,393,148 B1 | 5/2002 | Bhaskar | .......... | 382/169 |
| 6,697,107 B1 | 2/2004 | Hamilton, Jr. et al. | ....... | 348/234 |
| 6,876,778 B2 * | 4/2005 | Lin et al. | .......... | 382/266 |
| 7,006,709 B2 * | 2/2006 | Kang et al. | .......... | 382/294 |
| 2001/0046320 A1* | 11/2001 | Nenonen et al. | .......... | 382/169 |
| 2004/0081367 A1* | 4/2004 | Nonaka | .......... | 382/263 |
| 2004/0136605 A1* | 7/2004 | Segar et al. | .......... | 382/274 |

FOREIGN PATENT DOCUMENTS

EP    0398861    11/1990
EP    0531904    3/1993

* cited by examiner

*Primary Examiner*—Yosef Kassa
*Assistant Examiner*—Jayesh A Patel (57) ABSTRACT

A low frequency value for a pixel value is adjusted by a desired gain. A first high frequency value for the pixel value is calculated. A second high frequency value is generated for the first high frequency value. The second high frequency value is the first high frequency value adjusted by a factor. The factor is resolved as a function of the first high frequency value and the desired gain. A modified value for the pixel value is outputted, where the modified value is the adjusted low frequency value augmented by the second high frequency value.

24 Claims, 5 Drawing Sheets

ADJUSTING PIXELS BY DESIRED GAINS AND FACTORS

BACKGROUND

Digital images often use modification to account for noise and other imperfections within a captured image. These modifications may be made on the device that initially captures an image or may be made on a different device to which the image has subsequently been transferred for modification. It should also be noted that in some instances only a selective portion of the image is modified. That is, selective pixels of the image are identified for some form of correction or modification while the remaining pixels of an image are not modified.

One type of modification is used to adjust the brightness or color of an image. The typical technique for doing this is to linearly increase pixel values within the image for the luminance and/or color channels. The problem with this technique is that any noise, originally contained within the channels, is proportionally increased when linear increases are made.

DETAILED DESCRIPTION

Figure 1:
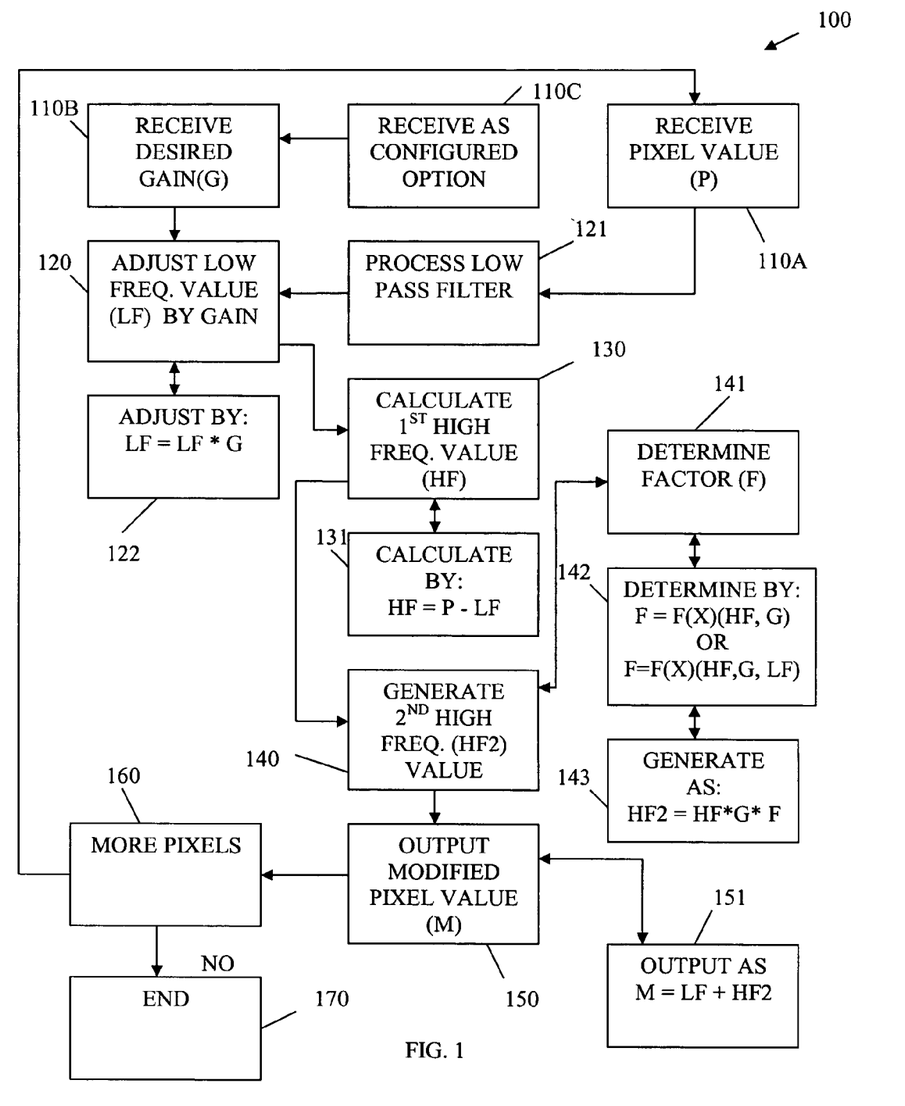
FIG. 1 is a diagram of a method for adjusting a desired gain of a pixel value, according to an example embodiment.

FIG. 1 is a diagram of a method 100 for adjusting a desired gain of a pixel value, according to an example embodiment of the invention. The method 100 (hereinafter "processing") is implemented in a machine-accessible and readable medium and is optionally accessible over a network. In one embodiment, the processing is implemented as a service accessible over a network, such as the Internet. In another embodiment, the processing is embedded in a device, such as a digital camera, personal digital assistant (PDA), digital phone, printer, laptop, desktop computer (client), server, peripheral device, etc. The processing permits configurable gains for luminance and/or color channels of an image or a selective portion of that image.

An image is electronically represented as a collection of pixels having values. The values represent light and color attributes for the image. The light is distributed as luminance channels (via the pixel values of the image) and each color or the colors collectively as a whole are distributed as color frequency channel(s) (via the pixel values of the image). It should be noted that the teachings presented herein and below may be applied to a luminance channel, a single color channel, a collection of color channels, and/or a combination of luminance and/or color channels. Moreover, the teachings presented herein may be applied to a selective portion of a single image, such as a subset of pixels for an image. Alternatively, the teachings presented herein may be applied to an entire image.

At 110A, a pixel value for a pixel that is being processed is received. Prior, concurrent, or subsequent to 110A a desired gain is received, at 110B. The desired gain represents a configurable increase that is desired for luminance and/or color channel(s) for an image or a portion of the image. This desired gain and the image or portion of the image can be received by separate interfaces that communicate with the processing. The gain may be received as a percentage increase or as an integer value represented on a configurable scale (e.g., 1-10, etc.). Accordingly, at 110C, the desired gain may be received as a configured option to the processing.

At 120, once the desired gain and pixel value are known and received, a low frequency value for the pixel value is adjusted by the gain to acquire an adjusted low frequency value for the initial received pixel value. In one embodiment, this is achieved by running a low pass filter, at 121, against surrounding pixels associated with the received pixel value. For example, the pixel value received is associated with an original pixel, where the original pixel is surrounded by a plurality of surrounding pixels. A configurable chunk of these surrounding pixels (e.g., 3.times. 3, etc.) and the original pixel are added together and then an average is taken. The average then becomes a low frequency value for the original pixel value. It is to be understood, than an average of surrounding pixel's is but one type of low pass filter that can be used with the teachings presented herein to acquire an initial low frequency value for the originally received pixel value (hereinafter "P"). In fact, any custom-developed or existing low pass filter may be used.

Once a low frequency value for the original pixel value is acquired, then it is adjusted by the desired gain. Adjustment can occur in a variety of manners; for example, in one embodiment, at 122, the low frequency value (LF) is adjusted by multiplying its value against the desired gain (G) to acquire a product that becomes the adjusted low frequency value (e.g., $LF=LF*G$).

At 130, a first high frequency value (HF) is initially calculated after the adjusted low frequency value (LF) is acquired. In one embodiment, at 131, the first HF value is calculated by the equation: $HF=P-LF$, where P is the original received pixel value and LF is the adjusted low frequency value acquired at 122.

Next, at 140, a second high frequency value (HF2) is generated. The HF2 represents a HF that is adjusted by a factor to minimize noise. The gain in the low frequency does not increase the noise in the high frequency channel it merely adjusts the overall brightness for the original pixel value. But, the sharpness of the pixel is diminished if the high frequency is not also increased. If the high frequency is gained up by the same scalar (desired gain G), then sharpness is maintained but significant detail may be lost because any noise associated with the pixel value (P) will also be proportionally increased. Thus, the HF2 represents a potential reduction in the noise by evaluating surrounding pixels of the image or portion of the image being gained up to determine a factor to adjust the first high frequency value (HF).

One technique for doing this is to determine, at 141, the factor (F). This may be done, by making the factor determination a function of the first high frequency value (HF) and the desired gain (G) (e.g., $F=F(X)(HF, G)$), as depicted at 142. For example, if the absolute value of HF (|HF|) is small near or equal to 0, then this may indicate that the P is located within a flat area of the image or portion of the image, such that neighboring pixel values to P do not deviate from one another much; therefore, any detected deviation may be assumed to be noise. As |HF| becomes larger and larger, then it may be assumed that big deviations between P and its surrounding pixel values are true details and not noise. In some other embodiments, at 142, the factor F may be determined as a function of the first high frequency value HF, the desired gain G, and the adjusted low frequency value LF (e.g., F=F(X)(HF, G, LF)).

For example, consider a first high frequency value (HF) and a desired gain (G), where, at 140, a second high frequency value (HF2) is being generated to minimize noise in an original pixel value (P) that is being gained up for luminance and/or color channel(s). Initially, the HF2 is acquired by multiplying HF by G (HF2=HF*G). Next, the value of HF2 is compared to a first threshold (T1), and if HF2 is at or below T1 (HF2<=T1), then the F is set to an inverse of G (F=1/G). This means a flat area was detected and any deviation is likely noise. In this case HF2 will end up being equal to the original HF (HF2=HF when (HF2*G)<=T1).

If HF2 is greater than T1; then HF2 is compared to a second threshold T2 to determine if HF2 is greater than or equal to T2 (HF2>=T2); and if this is the case, then F is set to 1. This means an area was detected for P where any deviation is likely detail and not noise, so HF2 remains HF*G because HF*G=HF*G*1, where 1 is F. So, in this event the entire G is applied to HF, since deviation in P was determined to be associated with detail and not noise.

If HF2 is between T1 and T2, then a configurable percentage may be assigned to F. This percentage can be interpolated between the inverse of G (1/G) and 1. This ensures a minimal amount of noise in the high frequency channel and maintains an optimal amount of detail.

As a result, in some embodiments, the modified HF2 may be generated, at 143, as HF2=HF*G*F, where F is a function of G and HF. It should be noted that the use of two thresholds to determine a value for F is but one example of a function utilizing G and HF. Other solutions and techniques are possible with the teachings of this invention. The point is that the high frequency value for the original pixel value P is not simply automatically increased by some scalar gain G; rather, an intelligent inspection and determination is made to minimize noise within the high frequency channel for P, that determination is achieved by multiplying a first high frequency value HF by G and then a resolved factor F that may potentially reduce G by some set amount to reduce or minimize noise.

At 150, a modified pixel value M for the original pixel value P is outputted by the processing. In one embodiment, at 151, this is achieved by adding the adjusted low frequency value LF to the generated second high frequency value HF2, such that M=LF+HF2. M represents an increase in brightness/color for P, achieved via a configurable amount that was inputted as G, where P is not necessarily increased by G for its high frequency value; rather the high frequency value was intelligently computed based on a determined factor to minimize noise within P. The result is that a configurable gain up for P is achieved in a non linear fashion where noise is minimized within M.

At 160, a check is made to determine if more pixels have to be processed for the image or portion of the image that is being gained up by G. If more pixels are as of yet unprocessed, then processing continues for a next pixel value as a new P, at 110A. The processing of the method 100 iterates until, at 160, it is determined that each pixel within an image or portion of an image that is being gained up by G has been processed, at which point processing terminates at 170.

Figure 2:
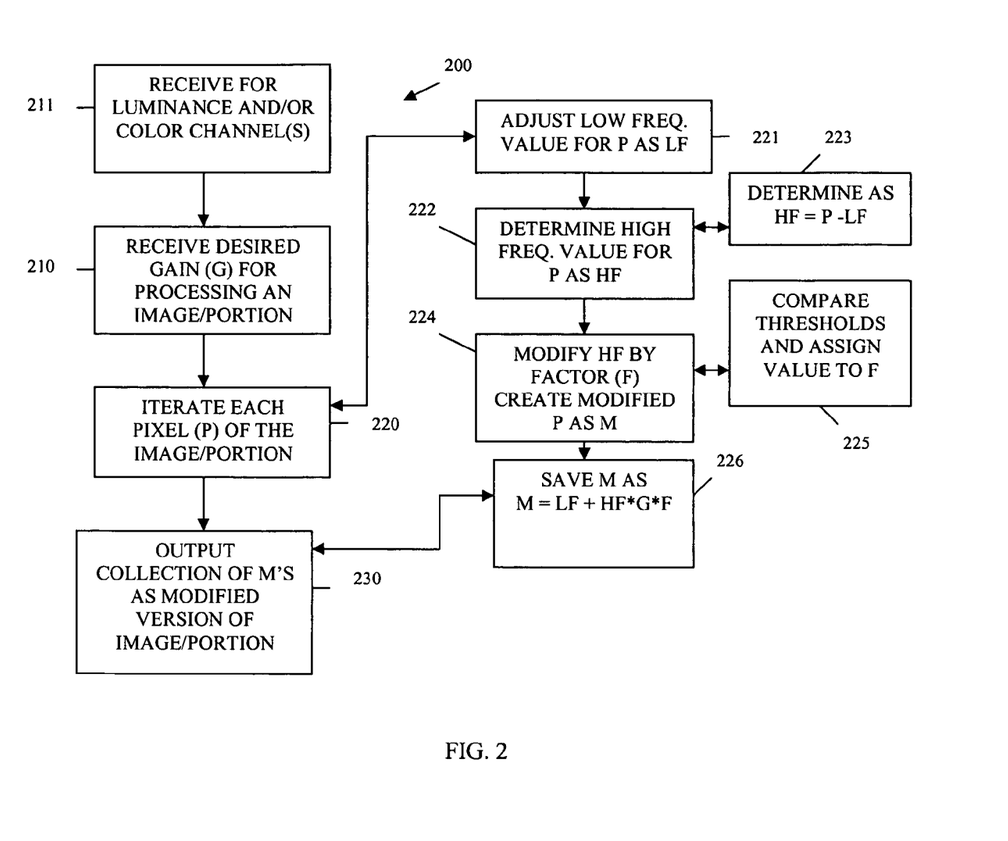
FIG. 2 is a diagram of another method for adjusting a desired gain of a pixel value, according to an example embodiment.

FIG. 2 is another method 200 for adjusting a desired gain of a pixel value, according to an example embodiment. The method 200 is implemented in a machine-accessible and readable medium and is optionally accessible over a network.

In one embodiment, the method 200 is implemented as a service over a network. In another embodiment, the method 200 is implemented within a device that is capable of processing images.

Initially, at 210, a desired gain (G) is received for processing an image or a selective portion of the image. The gain may be received, at 211, for increasing luminance and/or color channel(s) within the image or portion of the image. Next, at 220, each pixel within the image or portion of the image which is being enhanced by the gain is iterated for purposes of applying the configurable gain to each pixel while minimizing noise.

During each iteration, at 221, a low frequency value (LF) is acquired for a pixel value being processed (P). Any low pass filter may be used to acquire a LF, as discussed above with respect to method 100 of FIG. 1. The LF is adjusted by multiplying it by the gain. Thus, the adjusted LF becomes LF=LF*G. Next, at 222, a high frequency value (HF) for P is acquired. In some embodiments, at 223, the initial HF is determined by HF=P−LF (the adjusted LF).

At 224, the HF is modified by a factor F. F is a function of HF and G. Optionally, F may also be a function of HF, G, and LF. That is, the G is compared with the initially determined HF to determine what portion of G should be applied to HF in order to optimally avoid noise in P. One technique for doing this is to take the absolute value of HF (|HF|) and compare that to one or more thresholds (T1, T2, etc.), at 225. These comparisons yield a factor value (F) that represents a percentage increase in G to apply to HF. A full 100% increase results in a factor value of 1, which means all of G is applied to HF as HF=HF*G. A 0% increase results in a factor value of 1/G (inverse of G), which means none of G is applied to HF (HF=HF*G*1/G). Values in between 1/G and 1 can be acquired via interpolation between two thresholds, such as T1 for (1/G) and T2 for 1. These values and thresholds may be dynamically computed or pre-defined in tables, compared against HF, and assigned as values for F at 224 and 225.

The modified HF represents a potentially configurable decrease in G being applied to the HF. This is done to minimize noise as was described above with respect to method 100. Once the modified HF is acquired, a modified value for P represented by M is saved at 226. In one embodiment, M=LF (adjusted value)+HF*G*F.

Once each pixel of the image or portion of the image has been gained up by G, then processing of the method 200 passes to 230, where the collection of modified pixel values (M's) are outputted as a modified version of the image or portion of the image. The modified version represents a configurable increase G that was applied to the original version for luminance and/or color channel(s), where the noise has been minimized in the high frequency channel.

It should be pointed out that the other techniques may be used above to modify the percentage of gain applied to the high frequency value for each iterated pixel. The point is that the high frequency value is not just multiplied by some scalar G (desired gain); rather, the high frequency value is inspected to make a determination if a reduction is beneficial in order to minimize noise. This reduction is represented by the novel factor, which is determined as a function of the high frequency value and the desired gain.

Figure 3:
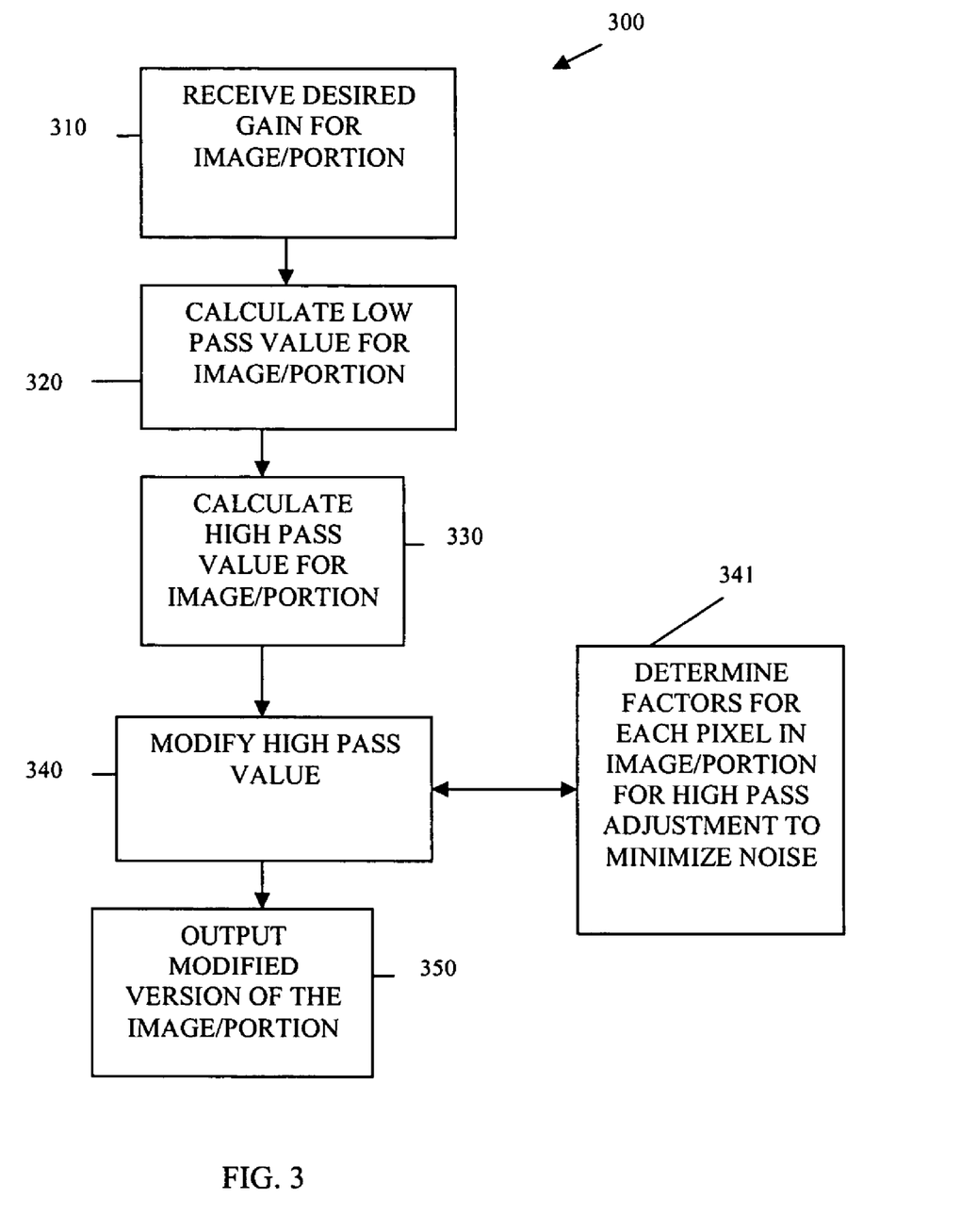
FIG. 3 is a diagram of yet another method for adjusting a desired gain of a pixel value, according to an example embodiment.

FIG. 3 is a diagram of yet another method 300 for adjusting a desired gain of a pixel value, according to an example embodiment. The method 300 is implemented as instructions in a machine-accessible or readable medium. The instructions when accessed perform the method 300. The instructions may reside on a medium that is removable or permanent (memory or storage). Moreover, the instructions do not have to contiguously reside on a single medium. That is, the instructions may be assembled logically from a plurality of disparate and remote media. In one embodiment, the instructions are downloaded from media associated with a remote service and processed locally. In another embodiment, the instructions are uploaded from the medium into and installed on a processing device. In still another embodiment, the instructions are uploaded from the medium and processed remotely on a server device as a service.

At 310, a desired and configurable gain (G) for an image or portion of an image is received. The gain can be received by an administrative interface, which is in communication with the processing of the method 300, or received as an execution parameter to an executing instance of the method 300. Concurrent, prior, or subsequent to receiving the G, an image or portion of an image is received for processing the desired G. Receipt of the image or portion of the image may be by a file, a file name, a pointer, a database reference, a directory reference, and the like.

At 320, a low pass frequency value for the image or portion of the image is calculated. At 330, a high pass frequency value for the image or portion of the image is calculated. Many different available low pass filters may be used. Moreover, an example average low pass filter was provided above with respect to method 100. In one embodiment, the high pass frequency value is calculated by taking the low pass frequency values for each pixel value in the image or portion of the image and subtracting it from each pixel's original value before it was low pass filtered.

At 340, the high pass frequency value for each pixel within the high pass frequency value for the image or portion of the image is modified. Modification occurs to reduce noise that may be introduced by simply applying the desired G to each pixel of the original image or portion of the image.

Accordingly, at 341, factors are determined for each pixel in the high pass frequency value for the image or portion of the image. These factors potentially reduce the gain for the pixels by percentages. Some pixels receive the full gain, in which case the factor values are 1 meaning that the high pass frequency values are multiplied by the desired gain to get modified high pass frequency values. Other pixels receive no gain, in which case the factor values are the inverse of G (1/G) meaning that the high pass frequency values are not modified at all by G. Further, some pixels receive a configurable portion or percentage of the gain meaning that the high frequency values are multiplied by the gain and a percentage which reduces the gain.

At 350, a modified version of the image or portion of the image is outputted. The modified version represents the sum of the adjusted low pass frequency value added with the modified high pass frequency value. The result is a configurable gain in luminance and/or color channel(s) for the original image or portion of the image where the high frequency channels are adjusted to minimize noise being introduced.

Figure 4:
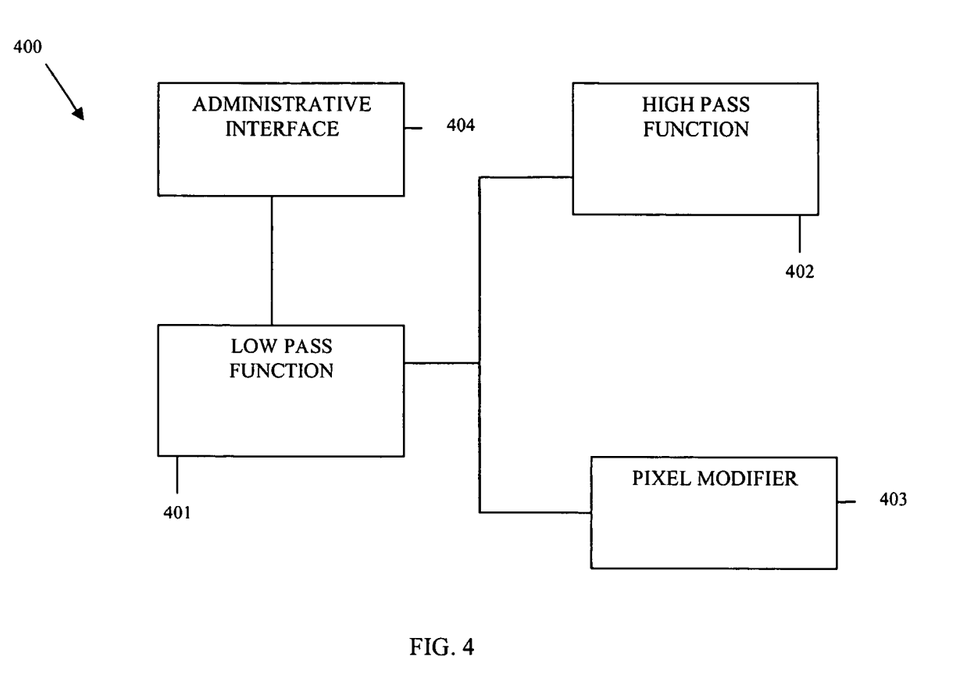
FIG. 4 is a diagram of a pixel adjustment system, according to an example embodiment.

FIG. 4 is a diagram of one pixel adjustment system 400, according to an example embodiment. The pixel adjustment system 400 is implemented in a machine-accessible and readable medium and is optionally accessible over a network. The pixel adjustment system 400 implements the methods 100, 200, and/or 300. In one embodiment, the pixel adjustment system 400 is installed on a server and provided as a service over a network. In another embodiment, pixel adjustment system 400 is installed within a device that is capable of processing images.

The pixel adjustment system 400 includes a low pass function 401 and a high pass function 402. Optionally, the pixel adjustment system 400 also includes a pixel modifier 403 and an administrative interface 404. The low pass function 401 includes a low pass filter to acquire a low frequency value for a given pixel value. In one embodiment, this includes averaging pixel values that surround the given pixel in a configurable area and using the average value as the low frequency value for the given pixel value. Of course a variety of other low pass filters, commercially known or custom developed may be used with the pixel adjustment system 400 and are intended to fall within the scope presented herein.

The low pass function 401 also adjusts a given low frequency value for a given pixel value. This can be achieved by multiplying a given configurable gain provided to the pixel adjustment system 400 by the low frequency value for the given pixel. This scalar increase is acceptable since the increase in the low frequency channel increases brightness but does not impact noise.

The high pass function 402 determines a first high pass frequency value for a given pixel value by subtracting the adjusted low frequency value from the given pixel value. This first high pass frequency value is then modified by a factor of the desired gain. That factor is resolved as a function of the first high pass frequency value and the desired gain.

In some embodiments, the factor is assigned based on a mapping function that compares an absolute value of the first high frequency value against one or more thresholds. The comparisons permit the high pass function 402 to determine when a desired gain is attempting to be applied to a flat area of the image or portion of the image indicating that any deviation is likely noise, when a desired gain is attempting to be applied to an area where any deviation is likely detail and not noise, and when the desired gain is attempting to be applied to an area where deviation is likely both partially noise and partially detail.

The high pass function 402 generates a modified high frequency value for each pixel value as the first high frequency value multiplied by the desired gain which is further multiplied by the resolved factor. Next, in one embodiment, a pixel modifier 403 is provided with the adjusted low frequency value and the modified high frequency value. These two values are added together by the pixel modifier 403 for a given pixel value to generate a modified pixel value. The modified pixel value is combined with other modified pixel values to represent a modified version of an image or portion of an image. That modified image or portion of an image is gained up by the desired gain for the low frequency and selectively gained up by different percentages of the desired gain for the high frequency for purposes of minimizing noise.

In one embodiment, an administrative interface 404 is interfaced to the pixel adjustment system 400 for purposes of providing configuration options and/or invoking or requesting the processing of the pixel adjustment system 400. One configuration option is the desired gain, which may be associated with luminance and/or color channel(s). That is, the desired gain may be applied to increase brightness for the light spectrum. Alternatively, the desired gain may be applied to a specific color frequency (e.g., red green, blue, yellow, etc.). The desired gain may also be applied to the entire color spectrum, selective groupings of the color and light spectrums, and various other combinations.

Figure 5:
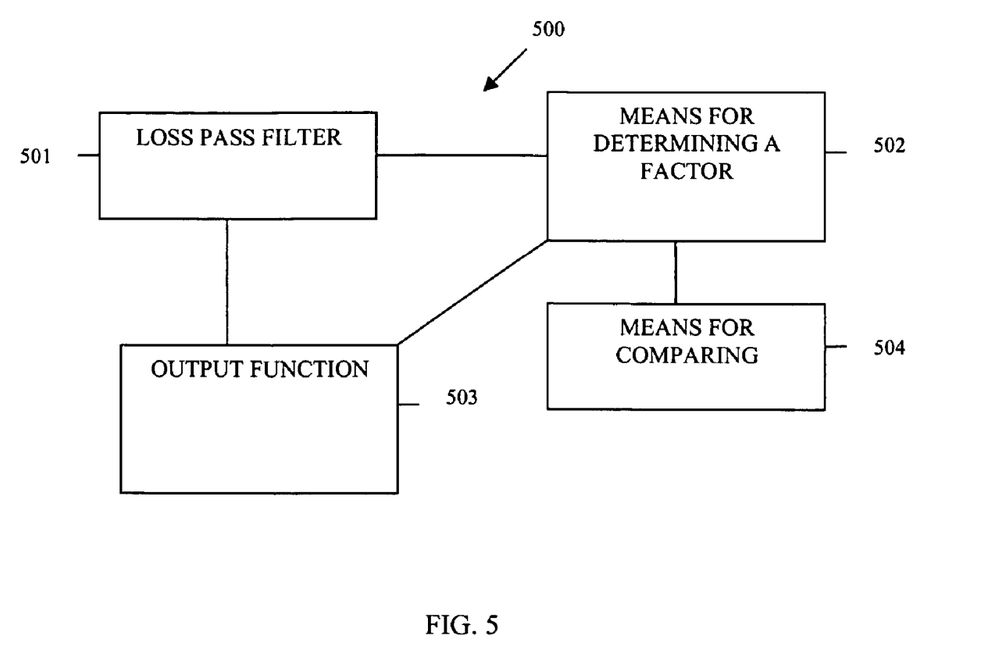
FIG. 5 is a diagram of another pixel adjustment system, according to an example embodiment.

FIG. 5 is a diagram of another pixel adjustment system 500, according to an example embodiment. Again, the pixel adjustment system 500 is implemented in a machine-accessible and readable medium and is optionally accessible over a network. The pixel adjustment system 500 may be operational on a network device or resource that services a plurality of clients, such that the pixel adjustment system 500 is a service that gains up luminance and/or color channel(s) for a given image or portion of an image. Alternatively, the pixel adjustment system 500 may be embedded in an image processing device or any processing device capable of processing or rendering images.

The pixel adjustment system 500 includes a low pass filter 501, a means for determining a factor 502, and an output function 503. The low pass filter 501 is processed to acquire an adjusted low frequency value for a pixel value in response to a desired gain. The gain is a configured option provided to the pixel adjustment system 500 and available to the low pass filter 501. In one embodiment, the low pass filter 501 initially computes a low frequency value (LF) for a given pixel value (P), this low frequency value is adjusted by multiplying it by the desired gain (G) (e.g., LF=LF*P).

The means for determining a factor 502 is processed to resolve what percentage of the desired gain should be attributed to an initial high frequency value (HF). The initial high frequency value is computed as HF=P−LF (the adjusted LF). Next, HF is multiplied by G and then further multiplied by a factor F. F is resolved by determining whether the absolute value of HF is within certain predefined tolerances or thresholds that indicate whether noise is present, not present, or present to some degree. The means for determining a factor 502 may be a software, firmware, and/or hardware module that performs a function that resolves a value for the factor based on the desired gain, an initial high frequency value, and optionally the adjusted low frequency value.

In one embodiment the means for determining 502 also includes a means for comparing 504 the desired gain and the HF to one or more predefined thresholds in order to assign a percentage of G that should be applied to HF for a given P. For example, if the absolute value of HF is at or below a first threshold T1, then this is an indication that P is in a flat area of the image or portion of the image and that F should be assigned the value of 1/G. In this manner, HF becomes P−LF because HF*G−1/G equals HF, which is P−LF. Essentially, no gain is made to HF when the absolute value of HF is at or below T1. If the absolute value of HF is above T1, then a second comparison may be made to a second threshold T2. Here, if HF is at or above T2, then P is in an area of the image or portion of the image where any deviation appears to be detail and not noise; therefore, F is assigned the value 1 and HF becomes (P−LF)*G*1. If the absolute value of HF is in between T1 and T2, then any mapping function or interpolation function may be used to map a value of F to values between 1/G and 1.

The gain up in the low frequency channel is linear; however the gain up in the non frequency channel includes a number of modified HF values that were increased in a non linear fashion through use of the means for determining a factor 502. The result is a modified image or portion of an image that has a configurable gain achieved in the luminance and/or color channel(s) where the noise present in the high frequency channel has been minimized or reduced during the gain up.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72 (b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method comprising:
adjusting a low frequency value for a pixel value by a desired gain;
calculating a first high frequency value for the pixel value;
generating a second high frequency value as the first high frequency value adjusted by a factor, wherein the factor is a function of the first high frequency value and the desired gain, where the function determines the factor as a percentage value that increases or decreases based on a comparison of an absolute value of the first high frequency value to a first and second threshold to indicate whether noise is present; and
displaying a modified pixel value as the adjusted low frequency value augmented by the second high frequency value.

2. The method of claim 1 further comprising, processing a low pass filter on an image or portion of the image associated with the pixel value to acquire the low frequency value.

3. The method of claim 1 further comprising, iterating the method for each pixel of an image or portion of the image.

4. The method of claim 1 further comprising, receiving the desired gain as a configurable option for processing an image or portion of the image.

5. The method of claim 1, wherein adjusting the low frequency value further includes multiplying the low frequency value by the desired gain.

6. The method of claim 5, wherein calculating the first high frequency value further includes subtracting the low frequency value from the pixel value.

7. The method of claim 6, wherein generating the second high frequency value further includes setting the second high frequency value as the first high frequency multiplied by the desired gain, which is then further multiplied by the factor.

8. The method of claim 1, wherein generating further includes determining the factor as a function of the first high frequency value, the desired gain, and the adjusted low frequency value.

9. A method comprising:
receiving a desired gain for processing an image or portion of the image;
iterating each pixel of the image or the portion of the image by:
adjusting a low frequency value for each pixel;
determining a high frequency value for each pixel;
modifying the high frequency value by a factor where the factor is resolved as a function of a first high frequency value, acquired by subtracting the low frequency value from an original value of the pixel being iterated, and the desired gain, and includes:
comparing the first high frequency value multiplied by the desired gain to a first threshold if the comparison is at or below the first threshold then the factor is set to an inverse of the desired gain;
comparing the first high frequency value multiplied by the desired gain to a second threshold, if the comparison is at or above the second threshold then the factor is set to the desired gain; and interpolating to acquire a value for the factor between the inverse of the desired gain and the desired gain if the first high frequency value is in between the first and second thresholds; and saving a modified pixel for each pixel that is represented by the adjusted low frequency value added to the modified high frequency value; and displaying a modified version of the image or portion of the image as a collection of the saved modified pixels.

10. The method of claim 9, wherein in receiving further includes receiving the desired gain for at least one of a luminance channel and a color channel.

11. The method of claim 9, wherein the processing of the method is embedded within a device.

12. A device comprising:
a memory comprising stored instructions that when executed provide:
a low pass function configured to determine an adjusted low frequency value for a pixel value in response to a desired gain;
a high pass function that determines a high frequency value for the pixel value and then adjusts the high frequency value by a factor, the factor being a percentage value that increases or decreases based on a comparison of an absolute value of the high frequency value to a first and second threshold to indicate whether noise is present; and
a display for displaying an image using the pixel values from the memory.

13. The device of claim 12 further comprising, an pixel modifier function that outputs a modified value for the pixel value represented by the sum of the adjusted low frequency value and the adjusted high frequency value.

14. The device of claim 12 further comprising, an administrative interface that provides an image or portion of the image associated with the pixel value and the desired gain to the system.

15. The device of claim 12, wherein the low pass function is a low pass filter that averages values for surrounding pixels within a configurable area of the pixel value to acquire the low frequency value for the pixel value.

16. The device of claim 12, wherein the high pass function assigns the factor a value represented by an inverse of the desired gain when the high pass frequency value multiplied by the desired gain compares to the first threshold, and wherein the high pass function assigns the factor a value as the desired gain when the high pass frequency value multiplied by the desired gain compares to the second threshold.

17. A system, comprising:
a low pass filter for acquiring an adjusted low frequency value for a pixel value in response to a desired gain;

means for generating a high frequency value for the pixel value and adjusting the high frequency value by a factor, the factor being a percentage value that increases or decreases based on a comparison of an absolute value of the high frequency value to a first and second threshold to indicate whether noise is present in an area of the pixel value; and an output function that displays a modified value for the pixel value as the adjusted low frequency value combined with the adjusted high frequency value.

18. The system of claim 17, wherein the means for generating further includes means for comparing the desired gain and a first high frequency value to one or more thresholds in order to assign a value to the factor.

19. The system of claim 18, wherein the high frequency value is adjusted by multiplying the first high frequency value with the factor.

20. The system of claim 17, wherein the modified value represents a non linear adjustment to the pixel value.

21. A computer readable medium encoded with computer readable instructions for modifying an image or portion of the image, the instructions when executed cause a computer to perform a method comprising:
receiving a desired gain for an image or portion of the image;
calculating a low pass value for the image or portion of the image in response to the desired gain;
calculating a high pass value for the image or portion of the image;
modifying the high pass value by factors associated with each pixel of the image to minimize noise, where a factor is determined as a value represented by an inverse of the desired gain when the high pass value multiplied by the desired gain is near a first threshold, and where the factor increases toward a value of one when the high pass frequency value multiplied by the desired gain approaches a second threshold; and
displaying a modified version of the image or portion of the image representing the low pass value of the image or portion of the image added to the modified high pass value of the image or portion of the image.

22. The computer readable medium of claim 21 where the instructions are stored and executable on a server as a service that is accessible over a network.

23. The computer readable medium of claim 21 where the instructions are stored and executable on a device.

24. The computer readable medium of claim 21, wherein modifying further includes resolving the factors as a function of a first high frequency value calculated for each pixel and the desired gain.

* * * * *